*Murdock & Kellar,*
*Harness Saddle.*
N° 9,328. Patented Oct. 12, 1852.
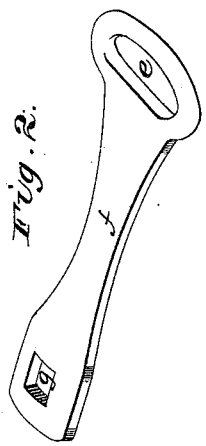
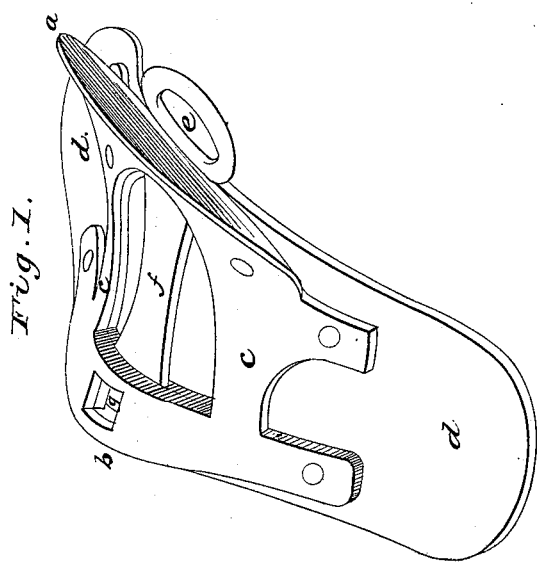

UNITED STATES PATENT OFFICE.

THOMAS MARDOCK AND WM. C. KELLAR, OF CINCINNATI, OHIO.

HARNESS-SADDLETREE.

Specification of Letters Patent No. 9,328, dated October 12, 1852.

*To all whom it may concern:*

Be it known that we, THOMAS MARDOCK and WILLIAM C. KELLAR, both of Cincinnati, Hamilton county, Ohio, have made new and useful Improvements in the Construction of Harness-Saddles; and we do hereby declare the following to be a full and clear description of the nature and construction thereof, reference being had to the annexed drawings, making part of this specification.

The object of our invention is the construction of a harness saddle that shall be less liable to break and when broken shall be more easily repaired than those now in use.

In the annexed drawings the same letters refer to like parts.

Figure 1 is a harness saddle tree. Fig. 2 is a detached view of the crupper loop.

In place of the usual clumsy and unyielding wooden tree we have a skeleton frame of malleable iron (*a*, *b*, and *c*,) of a peculiarly light and convenient form in which the cantle (*a*) is united to the journal (*b*) by side bars (*c*) cast solid to both. This frame is riveted to leather flaps (*d*). The crupper loop (*e*) in place of being as usual simply riveted to the back of the cantle, has a shank (*f*) which is inserted through the cantle and entering the pommel is secured to it by the bearing rein or pad hook, which is inserted into the square holes (*g*) of both pommel and loop and secured by screw nut below. By this construction and adaptation of the crupper loop, the latter, instead of being a source of weakness to the tree, is actually made a stay to brace and sustain it, and it is also free from the liability to tear loose from the cantle, an accident that frequently occurs, but should the loop in consequence of some extraordinary strain upon it give way at last it is very easily replaced by simply unscrewing the pad hook, inserting another loop, and screwing in the hook again. The tree itself in this arrangement possesses an absolute immunity from any liability to fracture by a strain upon the crupper loop.

Having thus described the nature of our improvements in harness saddle trees, what we claim therein as new and desire to secure by Letters Patent are—

The crupper loop (*e*) having a shank (*f*) which being inserted through the cantle and into the pommel is secured to the latter by the pad hook in the manner described.

In testimony whereof, we have hereunto set our hands before two subscribing witnesses.

THOMAS MARDOCK.
WM. C. KELLAR.

Witnesses:
GEO. H. KNIGHT,
E. M. BRADLEY.